June 18, 1957  J. MOYES  2,796,287
TAILGATE-SUPPORTING BUMPER-GUARD CONSTRUCTION
Filed Oct. 10, 1955
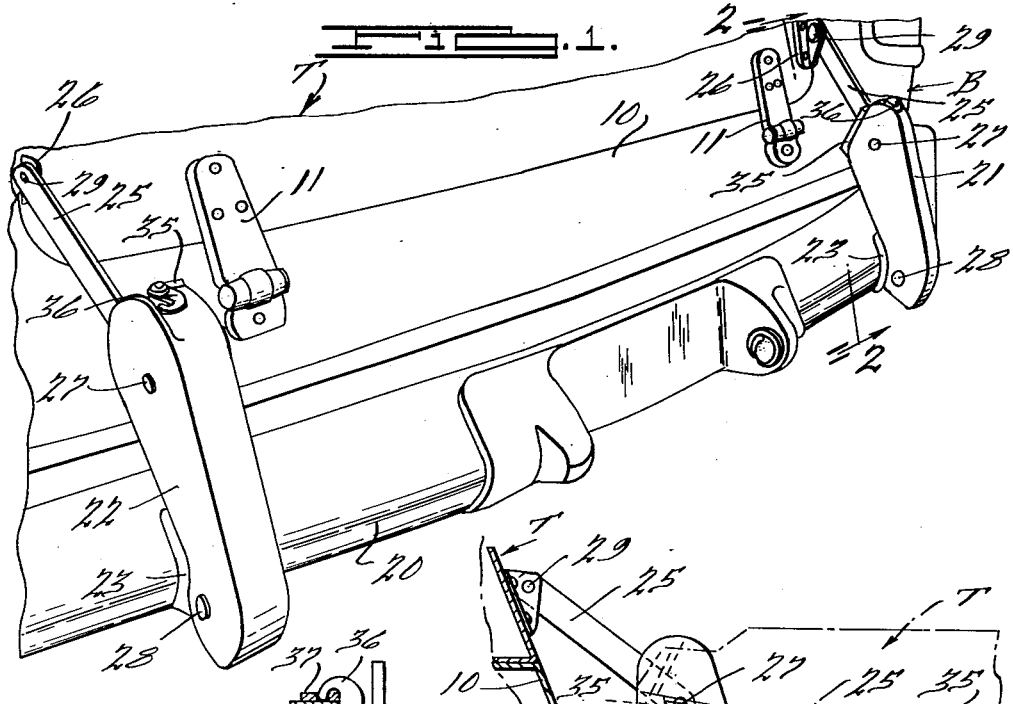
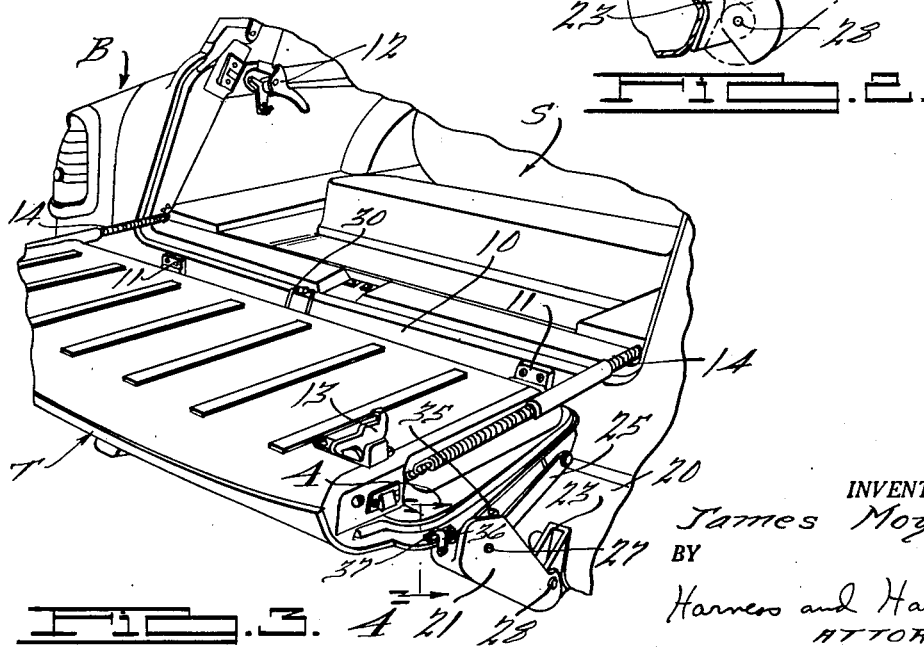
INVENTOR.
James Moyes.
BY
Harness and Harris
ATTORNEYS

United States Patent Office 2,796,287
Patented June 18, 1957

2,796,287

TAILGATE-SUPPORTING BUMPER-GUARD CONSTRUCTION

James Moyes, Pleasant Ridge, Mich., assignor to Chrysler Corporation, Highland Park, Mich., a corporation of Delaware Application October 10, 1955, Serial No. 539,627

5 Claims. (Cl. 296—57)

This invention relates to a tailgate support and particularly to a combination tailgate support and bumper guard.

It is a primary object of this inventon to provide a bumper guard that will serve as a support for the outer or free end portion of a hingedly mounted tailgate when said tailgate is in its lowered, load supporting position.

It is a further object of this invention to provide a hingedly mounted bumper guard that is connected by suitable linkage means to an associated, hingedly mounted, overlying, tailgate such that movement of the tailgate between a raised and a lowered position will move the bumper guard between its normal bumper protecting position and a position in which it supports the free end portion of the tailgate.

It is still another object of this invention to provide a shiftable, tailgate supporting, bumper guard that includes a latch means to prevent undesired oscillatory movement of a lowered tailgate during vehicle movement along rough or bumpy roads.

Other objects and advantages of this invention will become readily apparent from a reading of the following description and a consideration of the related drawings wherein:

Fig. 1 is a fragmentary perspective view of the rear end of a vehicle body having a hingedly mounted tailgate embodying this invention, the tailgate being shown in raised position;

Fig. 2 is a sectional elevational view taken along the line 2—2 of Fig. 1;

Fig. 3 is another fragmentary perspective view, similar to Fig. 1, of the rear end of a vehicle body having a tailgate supporting bumper guard that embodies this invention, the tailgate being shown in its lowered position; and Fig. 4 is a fragmentary sectional elevational view, taken along line 4—4 of Fig. 3, showing the latching means on one of the bumper guards engaged with a latch eye on the lowered tailgate.

In suburban type vehicles it is conventional to have a movable tailgate that closes the rear end of the vehicle body. These tailgates are usually hinged to the lower portion of the rear end of the vehicle body such that the tailgate may be swung between a substantially vertically extending raised position and a substantially horizontally extending lowered position. Because of the size and weight of these tailgates it is common to use some type of spring means to assist the tailgate operator in raising the tailgate from its lowered to its raised position. This spring means also serves as a cushioning means for retarding the lowering movement of the tailgate under the action of gravity. Because of the spring counterbalance means the lowered tailgate has a tendency to vibrate or oscillate when the vehicle is driven across a rough road if only light loads are applied to the tailgate. If heavy loads are applied to the lowered tailgate then this undesirable vibration may be eliminated but at the same time these heavy loads can produce rather large overhung or cantilever type loads at the tailgate hinges. This invention provides a means for relieving the tailgate hinges of a considerable portion of these overhung or cantilever type loads and also prevents the undesirable tailgate vibrations heretofore mentioned.

Fig. 1 shows the rear end of a vehicle body B that includes a hingedly mounted tailgate T. The tailgate T is connected to the sill portion 10 at the rear end of the body B by a pair of strap-type hinges 11. The hinges 11 readily permit the swinging movement of the tailgate T from its raised, substantially vertical, position shown in Fig. 1 to its lowered, substantially horizontal, position shown in Fig. 3. The tailgate T can be locked in its raised position by suitable latch means 12, 13 (see Fig. 3). A pair of tension springs 14 are stretched between suitable connections on the tailgate T and the body B to provide a counterbalance assist means for raising the tailgate and to also provide a means to cushion the lowering of the tailgate T. In place of the tension springs 14, or in addition thereto, a torsion bar spring 30, positioned along the lower edge or hinge axis of the tailgate T, can be used. Torsion bars are so well known in tailgate hinging structure that it is not thought to require any specific description herein, particularly when this structure does not form a part of this invention.

Extending across the rear end of the body B, rearwardly of sill 10, is a bumper 20. Bumper 20 is provided with a pair of vertically extending, transversely spaced, bumper guards 21 and 22 respectively. Bumper guards 21 and 22 are substantially identical and each has its lower end portion pivotally connected by pintle means 28 to a bracket 23 that is fixedly mounted on the bumper 20. Obviously the bracket 23 could be supported on some portion of the body B rather than on the bumper 20 if such an arrangement would be advantageous. Connected between the upper end portions of each of the pivotally mounted bumper guards 21, 22 and the associated tailgate T is an actuating link 25. One end of each link 25 is pivotally connected by a pintle 27 to the upper end of a bumper guard while the other end of each link 25 is pivotally connected by a pintle 29 to a bracket 26 that is mounted on the tailgate T at a position eccentrically located with respect to the hinging axis of the tailgate T. From the above description it is thought to be obvious that movement of the tailgate T from its raised, full-line, position in Fig. 1 to its lowered, broken-line, position in Fig. 2 will cause the bumper guards 21 and 22 to be moved between the full and broken line bumper guard positions shown in Fig. 2. When the tailgate T has been moved to its lowered position, see Figs. 3 and 4 particularly, it will be noted that the tailgate outer or free end portion is supported on the top surface of the upper ends of the bumper guards 21 and 22. To prevent the marring of the finish on the outer side of the tailgate T by the upper ends of the bumper guards, when the tailgate is resting on the bumper guards in its lowered position, the upper ends of the bumper guards are each provided with a resilient bumper pad 35. Also mounted on the upper end of one or more of the bumper guards 21 and 22 is a pivotally mounted hook-type latch 36. Latch 36 is arranged to be lockingly engaged with a mating latch plate 37 that is carried by the edge of the tailgate T as shown in Figs. 3 and 4.

While this invention is adapted for any vehicle tailgate, it is particularly adapted for use in a vehicle having a rearwardly facing rear seat S such as the vehicle shown in the co-pending patent application of James A. Huggins, Serial No. 538,150, filed October 3, 1955. In a vehicle of this latter type the lowered tailgate serves as a step to assist the rear seat passengers in mounting to and demounting from the rear passenger compartment. Accordingly, it is possible to have passenger loads of over 500 pounds applied to the tailgate by mounting or demounting passengers and thus the reason for the additional bumper guard support of the tailgate in its lowered position is thought to be obvious.

I claim:

1. In a vehicle having a tailgate hingedly mounted thereon to swing about a horizontal axis between a substantially vertically disposed closed position and a substantially horizontally disposed open position, tailgate counterbalance means to cushion movement of the tailgate to open position and to assist in movement of the tailgate to closed position, a bumper arranged to extend beneath said tailgate, said bumper having a bumper guard mounted thereon and arranged to supportingly engage the free end portion of said tailgate when said tailgate is moved to its substantially horizontal open position, and latch means engageable between said bumper guard and said tailgate when the tailgate is in open position to prevent relative movement therebetween.

2. In a motor vehicle, a body having a rear end portion provided with a tailgate hingedly connected to the body to swing about a transversely extending axis between a substantially vertically disposed closed position and a substantially horizontally disposed open position, a bumper guard having first portions movably mounted on said body and having other portions connected to said tailgate and arranged to be actuated by movement of said tailgate from its closed to its open position so as to relocate still other portions of said bumper guard beneath the outer free end portions of said tailgate to assist in support of the tailgate in its open position.

3. In a motor vehicle, a body having a rear end portion provided with a tailgate that is hingedly connected thereto by hinge means having hinge axes extending transversely of the body to permit the tailgate to be swung between a substantially vertical closed position and a substantially horizontal open position, an elongated, vertically disposed, bumper guard pivotally connected to said body at a location beneath the tailgate and adjacent the hinged portion thereof, and linkage means connected between said tailgate and said bumper guard arranged to swing said guard to a rearwardly disposed tailgate supporting position when said tailgate is moved to its open position.

4. In a motor vehicle, a body having a rear end portion provided with a tailgate that is hingedly connected thereto by hinge means having hinge axes extending transversely of the body to permit the tailgate to be swung between a substantially vertical closed position and a substantially horizontal open position, an elongated, vertically disposed, bumper guard pivotally connected to said body at a location beneath the tailgate and adjacent the hinged portion thereof, and linkage means connected between said tailgate and said bumper guard arranged to swing said guard to a rearwardly disposed tailgate supporting position when said tailgate is moved to its open position, said bumper guard having resilient cushioning means to contact the engaged portions of said tailgate.

5. In a motor vehicle, a body having a rear end portion provided with a tailgate that is hingedly connected thereto by hinge means having hinge axes extending transversely of the body to permit the tailgate to be swung between a substantially vertical closed position and a substantially horizontal open position, an elongated, vertically disposed, bumper guard pivotally connected to said body at a location beneath the tailgate and adjacent the hinged portion thereof, and linkage means connected between said tailgate and said bumper guard arranged to swing said guard to a rearwardly disposed tailgate supporting position when said tailgate is moved to its open position, and latch means engageable between said bumper guard and said tailgate to prevent relative movement therebetween when said tailgate is moved to its open position.

References Cited in the file of this patent

UNITED STATES PATENTS

| | | |
|---|---|---|
| 1,610,466 | Oversmith | Dec. 14, 1926 |
| 1,919,063 | Hubbard | July 18, 1933 |
| 2,350,050 | Lim | May 30, 1944 |
| 2,468,579 | Vuori | Apr. 26, 1949 |
| 2,538,930 | Zummach | Jan. 23, 1951 |